March 12, 1957     F. J. MAURER     2,784,734
CONTROL FOR FLOATS
Filed Nov. 1, 1955
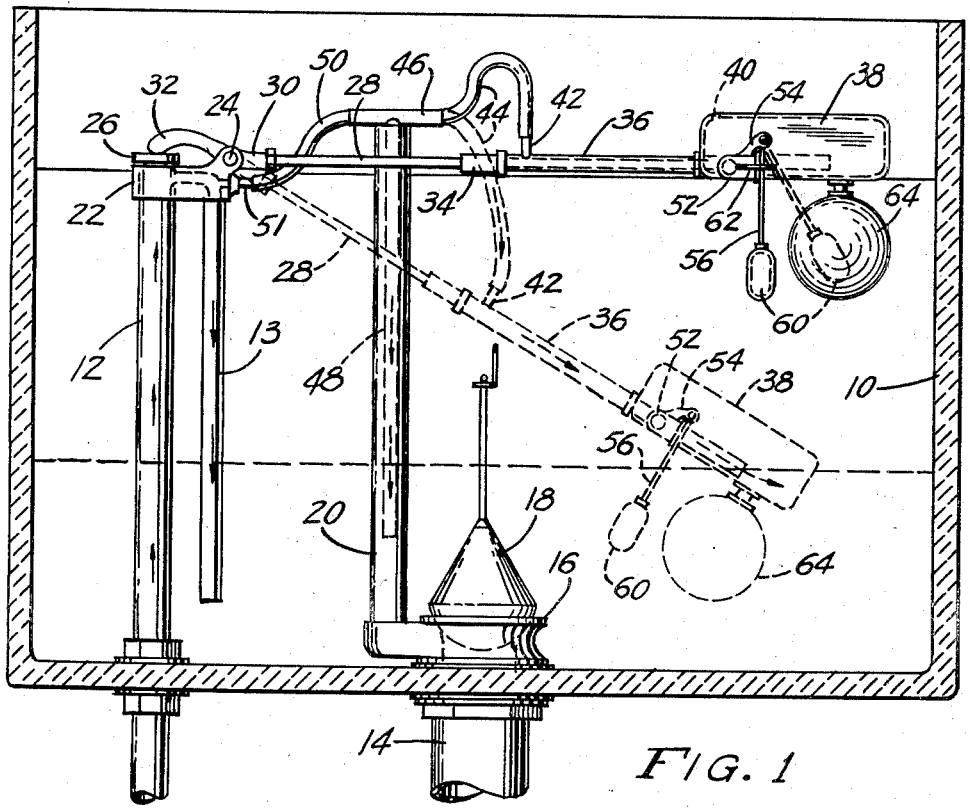
FIG. 1
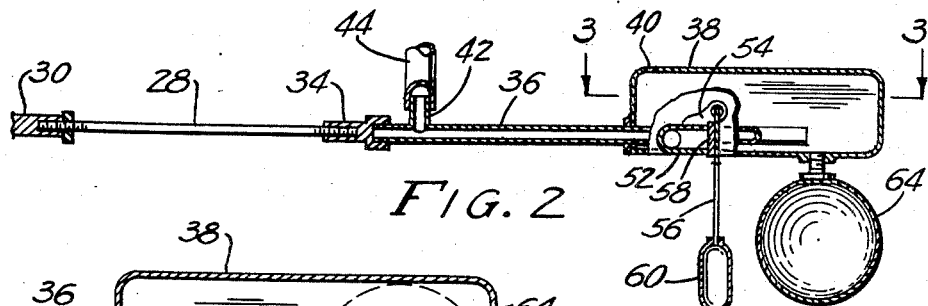
FIG. 2
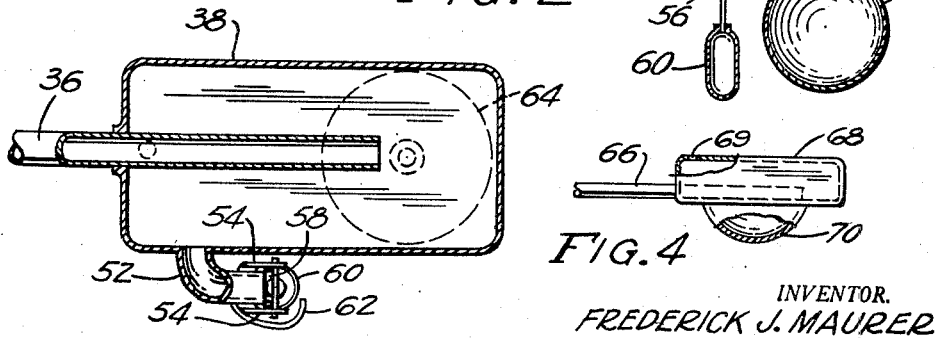
FIG. 3
FIG. 4
INVENTOR.
FREDERICK J. MAURER
BY
McMorrow, Berman + Davidson
ATTORNEYS United States Patent Office 2,784,734
Patented Mar. 12, 1957

2,784,734

CONTROL FOR FLOATS

Frederick J. Maurer, East Cleveland, Ohio

Application November 1, 1955, Serial No. 544,276

4 Claims. (Cl. 137—417)

This invention relates to flushing assemblies for water closets, and more particularly has reference to a control for regulating the action of the float provided in said assemblies, when the float is used in operating a valve which in turn controls the admission of water into the tank. Although the invention will be described with particular reference to the flush tank of a water closet, it is not necessarily restricted to use in this environment, and can be used to advantage in any of various tanks or vessels in which water is admitted through a float-controlled valve, without regard to the type of discharge.

Ordinarily, in a valve assembly of the type referred to, when water has been flushed out of the tank the float drops, and subsequently, as other water enters the tank, the float rises in the water in direct proportion to the amount of water passing through the valve controlled by the float. As the float rises it progressively throttles the flow of the incoming water. Since the incoming water or fluid must first pass through the valve before it can affect the movement of the float, it follows that an extended period of throttling takes place.

When floats are operated in this manner they exert a minimum of their potential buoyancy lift on the valve arms which they control or operate. Thus, in a conventional installation, when the float is in its valve-closing position, that is, at a point of maximum ascendency, only a very small portion of the float is immersed in the fluid. It follows that a very slight lowering of the water level would cause the controlled valve to begin to open. This action takes place every time a small amount of water is removed from the tank, causing continued periods of throttling, which in turn causes undue wear on the seat and disc of the supply valve. Further, there are also caused flow noises, and lengthening of the filling cycle. Further, this type of float requires, by reason of its particular operational characteristics, additional head room of the tank, since only a portion of the float is submerged in the fluid at the point of highest ascent of the float.

The present invention has for its main object the shutting off of the fluid supply valve with a minimum amount of throttling action, and summarized briefly, includes a normally empty container on the float-supporting end of the valve closing arm, which container is connected by a conduit to the water supply pipe, so that on each lowering of the arm and float, said chamber will also be lowered, as a result of which water flowing inwardly through said pipe will be discharged in part into the flush tank proper, and in its remaining part will be directed to the container, to fill said container in the lowered position of the float. Subsequently, as the float and container rise, but are still submerged in the fluid, the rising float assembly will close the inlet valve to a point such that the flow of supply of water is decreased through said valve. By reason of this arrangement, flow to the container is discontinued due to the fact that the conduit leading thereto offers, together with the container, a greater resistance to flow than does the outlet of the supply line directly into the tank. Thus, although flow stops in the line leading to the container, said container is still filled with fluid. By syphonic action and/or operation of a novel drain valve means, fluid is now drawn out of the float-weighting container rapidly, at this stage of the operation, and as a result, the buoyancy of the float assembly is suddenly increased, causing the float assembly to swiftly move upwardly to effect a rapid closure of the valve at the time the water has risen within the flush tank to the desired level. This closes the supply valve firmly and completely with a minimum of throttling, and provides other advantages to become apparent in the description provided hereinafter.

Other objects and advantages will appear from the following description, the claims appended thereto, and from the annexed drawing, in which like reference characters designate like parts throughout the several views, and wherein:

Figure 1 is a vertical sectional view through a flush tank equipped with a flow control assembly formed according to the present invention, said assembly being shown in full lines in its normal, valve-closing position and in dotted lines in its valve-opening position;

Figure 2 is a longitudinal sectional view through the float control assembly and associated arm, per se;

Figure 3 is a horizontal section through the float-weighting container; and

Figure 4 is a reduced, fragmentary side elevational view of a modified construction.

Referring to the drawings in detail, at 10 there is designated a conventional flush tank, having an upstanding water supply pipe 12. A main outlet pipe 13, communicating at its inlet end with the upper end of the pipe 12, opens downwardly near the bottom of the flush tank, to direct supply water directly into the flush tank for filling said flush tank following draining of water through the conventional drain pipe 14. Drain pipe 14 has the usual valve seat 16, normally closed by a manually elevatable flush valve 18. Projecting upwardly from the valve seat 16 at one side of the flush valve is the conventional overflow pipe 20.

Secured to the upper end of the supply pipe 12 is a laterally projecting bracket 22, carrying at its outer end a pivot pin 24. The water inlet valve or ball cock has been designated at 26, and normally closes the outlet of the supply pipe 12.

Pivotally mounted on the pin 24, for vertical swinging movement, is a float support arm 28, and connected to said arm is an extension 30, through which the pin 24 passes. The extension 30, at its free end, is downwardly curved, and bears against the ball cock 26, so that when the arm 28 is swung upwardly, the downwardly curving end of the extension will press downwardly upon the ball cock to close off the flow of supply water.

Secured to the other end of the arm 28 is a connecting fitting 34, having an axial recess in which is fixedly engaged one end of a tubular member 36 coaxially aligned with the arm 28 to constitute an extension of said arm. The tubular member 36, at its outer end, extends well into a container 38 which in the present instance, but not necessarily, is of flattened, rectangular shape. In the top wall of container 38 there is formed a small opening 40 comprising not only an air vent but also a port through which water overflowing from the container 38 may pass, in a manner to be made presently apparent.

Connected permanently in communication with the member 36, adjacent the inner end thereof, is a short branch member 42, to which is connected one end of a flexible tube or hose 44, the other end of which is connected to the tubular cross head 46 of an elongated, vertically depending container outlet pipe 48. Pipe 48 extends downwardly within the overflow pipe 20, so that any liquid flowing through pipe 48 will pass into the drain pipe 14 whether or not the flush valve 18 is seated.

Connected to the inlet end of the cross head 46 is one end of a connecting tube 50 of flexible formation, the other end of which is connected to a connecting passage 51 opening into the upper end of the main outlet pipe 13.

By reason of this arrangement, it will be apparent that assuming that the arm 28 is in its downwardly swung position as shown in dotted lines in Figure 1, the ball cock 26 will be unseated, and water will flow upwardly in the direction of the arrows shown in Figure 1 through pipe 12. Said water, passing out of the pipe 12, will flow downwardly within the pipe 13 into the flush tank to replace the water flushed therefrom. At the same time, water will flow in the direction of the arrows into the container 38, through the conduit leading to said container and comprised of tubular elements 51, 50, 46, 44, 42, 36. Some of the water flowing toward the container will also flow downwardly within the pipe 48 through the drain outlet 14.

Connected in communication with one side of the container or chamber 38 is an approximately L-shaped, laterally projecting container drain tube 52, and projecting upwardly from the free end portion of said tube is a pivot bracket 54 to which is pivotally connected the upper end of an arm member 56 to the upper end portion of which is secured a valve disc 58 adapted to close the outlet end of the drain tube 52. To the lower end of the arm member 56 is connected a small float 60 of elongated formation, aligned co-axially with the arm member.

To limit swinging movement of the arm member 56 in a valve-disc-unseating direction, there is provided an arcuate stop rod 62 (Figure 3) secured to the drain tube 52 and extending outwardly therefrom with its free end curved into the path of swinging movement of the arm member.

Connected to the underside of the chamber 38, but out of communication therewith, is a permanently sealed float ball 64.

In Figure 4 there is shown a slightly modified construction, wherein the conduit leading to the chamber 38, bearing analogy to the conduit 36, has been designated at 66 with the chamber or container being designated at 68 and having a vent opening 69. In this construction, the float ball 70 is of substantially hemispherical shape, being secured permanently to the underside of the container 38 and being capable, in fact, of being cast integrally with said container. In this form, the container does not include the drain valve means 52, 58, 60, and is emptied entirely by syphonic action.

In operation, assuming that the flush valve 18 has been elevated for draining of the liquid from the tank, the float assembly comprised of the float support arm means, the container 38 and the float ball 64, drops downwardly within the tank to or below the dotted line position shown in Figure 1. As previously explained, water now flows not only into the tank, but also fills the container 38. As the container fills, excess water is forced out of the same through the port 40. When the tank empties, the flush valve 18 drops back into a seated position, and the flush tank now begins to fill. The buoyancy of the float ball 64 causes the container 38 to be lifted slowly, with the ball cock still being held in almost fully open position throughout the filling of the flush tank. Ultimately, as the flush tank fills to the desired level with the container rising therein, the water is emptied out of the container rapidly in a manner to be now described.

Initially, the valve disc 58 is in seated position as shown in full lines in Figure 1. When the container 38 drops to its lower position, the arm 56 initially tends to remain vertical, unseating the valve disc 58. As a result, the container 38 fills with water, with excess water flowing not only out of the port 40 but also out of the drain tube 52.

However, with the container 38 in its lowermost condition, the arm member 56 is inclined rather than vertical, with the float 60 thereof swung to the left in Figure 1. This is due to the fact that when the container 38 is in its lowermost position, the arm member cannot still remain completely vertical due to the fact that it has engaged the stop element 62. Accordingly, although water at the moment is still flowing out of the drain tube 52, the flow of said water out of the drain tube is about to be stopped, due to the rising of the water level within the flush tank as the tank fills with the flush valve 18 in seated position.

Thus, as the water level rises, it ultimately reaches the float 60, and since said float 60 is to the left of a vertical line passing through its pivot point, the upward pressure of the water thereagainst will swing the float 60 further to the left in Figure 1, seating the valve 58.

The valve 58 will now be held in seated position during further upward movement of the float assembly, and ultimately, the face of the valve disc 58 will assume a vertical position, with arm member 56 and the float 60 similarly being disposed vertically. The continued upward movement of the float assembly, plus the head pressure of the fluid within the chamber or container 38, causes the float 60 to move to the right of a vertical line passing through the pivot point of the arm member 56. At this stage its buoyancy swings it to the right of the vertical line, swinging the disc 58 away from the valve seat on the end of drain tube 52. This opening of the drain tube permits the fluid in the chamber 38, to flow out of the chamber, thereby removing the weight of said fluid from the chamber. This is due to the fact that there is a head pressure within the chamber, and this head pressure will cause draining of the chamber 38 by reason of the fact that the buoyancy of the float 64 will have raised the level of the fluid within the container 38 above the level of the fluid in the flush tank.

Since the valve 58 opens substantially instantaneously, the water is drained from its container with corresponding speed, and is timed to drain from the container when the level of water within the flush tank is at the desired height. Therefore, the container 38, float 64, and float support arm now swing rapidly upwardly through the remaining part of their travel, causing a substantially instantaneous movement of the ball cock from substantially a full open position to a full closed position.

The construction, as will be appreciated, reduces throttling to a minimum, and further eliminates or substantially reduces "chattering" or vibration in the float controlled fluid supply valves and connected piping.

It may be noted, in this regard, that in the form of the invention shown in Figure 4, the water is removed from the chamber 68 entirely by syphonic action. In this arrangement, the flow is from chamber 68 through tubes 66, 42, 44, 46, 48, and then out through drain 14. In the construction shown in Figure 1, the water is removed through the drain tube 52 without syphonic action, or alternatively, is moved out of the container 38 by a combination of syphonic action and flow out of the drain 52.

The invention has the further advantages that it increases the flow rate through the fluid supply valve, by reducing the time length of the throttling cycle, and further, decreases the time required for filling the tank or vessel. Additionally, there is made possible the maintenance of a higher fluid line in the tank or vessel, without accompanying increase in the overall size thereof.

Other advantages may also be noted, and as one advantage, there is provided an increased life of the supply valve or ball cock resulting from the reduction of the throttling action, and increased power to operate the fluid supply valve in the closing cycle. This increased power is obtained due to the increased buoyancy of the float, by a reason of its full submersion. Therefore, comparatively smaller sizes of floats could be used for a given situation.

This produces a further advantage that comparatively larger seat openings could be used in the fluid supply where the valve closes against the fluid pressure, because of the additional buoyancy power produced by a float fully submerged.

It is believed apparent that the invention is not necessarily confined to the specific use or uses thereof described above since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A device for controlling the movement of a float within a tank comprising, in combination with a supply line and a valve for normally closing said supply line, a float support arm pivotally mounted within said tank and including at one end thereof means for closing the valve responsive to upward swinging movement of said arm; a float carried by the other end of the arm; a container carried by said other end of the arm; means providing a conduit between the container and said supply line, whereby water may flow to the container in the open valve position, thus to fill the container and reduce the buoyancy of the float, container, and arm; and valve means on the container responding to filling of the tank to a predetermined level to shift to open position for draining the container following filling of the tank to said level, whereby to permit upward swinging movement of the arm, container, and float over a path sufficient to effect a substantially instantaneous closing of the valve following filling of the tank to the selected level, said container having a continuously opened port providing a vent therefor acting also as an overflow port following filling of the container, said conduit communicating between the container and supply line constituting a tubular member forming part of said arm, and a flexible member communicating with said tubular member and connected between the tubular member and the supply line.

2. A device for controlling the movement of a float within a tank comprising, in combination with a supply line and a valve for normally closing said supply line, a float support arm pivotally mounted within said tank and including at one end thereof means for closing the valve responsive to upward swinging movement of said arm; a float carried by the other end of the arm; a container carried by said other end of the arm; means providing a conduit between the container and said supply line, whereby water may flow to the container in the open valve position, thus to fill the container and reduce the buoyancy of the float, container, and arm; and valve means on the container responding to filling of the tank to a predetermined level to shift to open position for draining the container following filling of the tank to said level, whereby to permit upward swinging movement of the arm, container, and float over a path sufficient to effect a substantially instantaneous closing of the valve following filling of the tank to the selected level, said container having a continuously opened port providing a vent therefor acting also an an overflow port following filling of the container, said conduit communicating between the container and supply line constituting a tubular member forming part of said arm, and a flexible member communicating with said tubular member and connected between the tubular member and the supply line, the valve means of the container including a drain tube projecting laterally, outwardly from the container, a flap valve normally closing said drain tube, and an arm and float assembly connected to said flap valve and adapted to swing the flap valve to open position following filling of the tank to said predetermined level.

3. A device for controlling the movement of a float within a tank comprising, in combination with a supply line and a valve for normally closing said supply line, a float support arm pivotally mounted within said tank and including at one end thereof means for closing the valve responsive to upward swinging movement of said arm; a float carried by the other end of the arm; a container carried by said other end of the arm; means providing a conduit between the container and said supply line, whereby water may flow to the container in the open valve position, thus to fill the container and reduce the buoyancy of the float, container, and arm; and valve means on the container responding to filling of the tank to a predetermined level to shift to open position for draining the container following filling of the tank to said level, whereby to permit upward swinging movement of the arm, container, and float over a path sufficient to effect a substantially instantaneous closing of the valve following filling of the tank to the selected level, said container having a continuously opened port providing a vent therefor acting also as an overflow port following filling of the container, said conduit communicating between the container and supply line constituting a tubular member forming part of said arm, and a flexible member communicating with said tubular member and connected between the tubular member and the supply line, the valve means of the container including a drain tube projecting laterally, outwardly from the container, a flap valve normally closing said drain tube, and an arm and float assembly connected to said flap valve and adapted to swing the flap valve to open position following filling of the tank to said predetermined level, said arm and float means of the flap valve including an arm member pivotally mounted upon and extending downwardly from the drain tube, said arm member swinging about an axis paralleling the axis of swinging movement of the float support arm, and a float secured to the lower end of said arm member.

4. A device for controlling the movement of a float within a tank comprising, in combination with a supply line and a valve for normally closing said supply line, a float support arm pivotally mounted within said tank and including at one end thereof means for closing the valve responsive to upward swinging movement of said arm; a float carried by the other end of the arm; a container carried by said other end of the arm; means providing a conduit between the container and said supply line, whereby water may flow to the container in the open valve position, thus to fill the container and reduce the buoyancy of the float, container, and arm; and valve means on the container responding to filling of the tank to a predetermined level to shift to open position for draining the container following filling of the tank to said level, whereby to permit upward swinging movement of the arm, container, and float over a path sufficient to effect a substantially instantaneous closing of the valve following filling of the tank to the selected level, said container having a continuously opened port providing a vent therefor acting also as an overflow port following filling of the container, said conduit communicating between the container and supply line constituting a tubular member forming part of said arm, and a flexible member communicating with said tubular member and connected between the tubular member and the supply line, the valve means of the container including a drain tube projecting laterally, outwardly from the container, a flap valve normally closing said drain tube, and an arm and float assembly connected to said flap valve and adapted to swing the flap valve to open position following filling of the tank to said predetermined level, said arm and float means of the flap valve including an arm member pivotally mounted upon and extending downwardly from the drain tube, said arm member swinging about an axis paralleling the axis of swinging movement of the float support arm, and a float secured to the lower end of said arm member, said last named float being of elongated formation and being extended in coaxial alignment with the arm member, the last named float being adapted to swing the arm member and flap valve to a valve-unseating position responsive to movement of the last named float laterally of the pivot point of the arm member in a direction away from the drain tube, whereby to open the flap valve responsive to pressure exerted by the liquid within the tank against the last named float acting in conjunction with the pressure of water within the drain tube against the flap valve.

References Cited in the file of this patent
UNITED STATES PATENTS

| | | |
|---|---|---|
| 2,230,911 | Russel | Feb. 4, 1941 |
| 2,582,853 | Smith | Jan. 15, 1952 |